US010239756B1

(12) United States Patent
Wang et al.

(10) Patent No.: US 10,239,756 B1
(45) Date of Patent: Mar. 26, 2019

(54) PROCESS FOR SULFUR RECOVERY FROM ACID GAS STREAM WITHOUT CATALYTIC CLAUS REACTORS

(71) Applicant: Saudi Arabian Oil Company, Dhahran (SA)

(72) Inventors: Yuguo Wang, Dhahran (SA); Rashid Othman, Khobar (SA); Qi Xu, Dhahran (SA); Ismail Alami, Dammam (SA)

(73) Assignee: SAUDI ARABIAN OIL COMPANY (SA)

( * ) Notice: Subject to any disclaimer, the term of this patent is extended or adjusted under 35 U.S.C. 154(b) by 0 days.

(21) Appl. No.: 15/826,143

(22) Filed: Nov. 29, 2017

(51) Int. Cl.
*C01B 17/04* (2006.01)
*B01J 20/18* (2006.01)
(Continued)

(52) U.S. Cl.
CPC ............ *C01B 17/04* (2013.01); *B01D 5/0057* (2013.01); *B01D 53/04* (2013.01); *B01D 53/343* (2013.01);
(Continued)

(58) Field of Classification Search
CPC . C01B 17/04; C01B 17/0404; C01B 17/0447; C01B 17/0456; B01D 53/52;
(Continued)

(56) References Cited

U.S. PATENT DOCUMENTS

| | | | |
|---|---|---|---|
| 4,919,912 A * | 4/1990 | Taggart | C01B 17/0404 423/222 |
| 5,294,428 A | 3/1994 | Watson | |
| 5,965,100 A | 10/1999 | Khanmamedov | |
| 6,214,311 B1 | 4/2001 | Kwong | |
| 6,508,863 B1 | 1/2003 | Byrne et al. | |

(Continued)

FOREIGN PATENT DOCUMENTS

WO    9507855 A1    3/1995

OTHER PUBLICATIONS

Vasques, et al., "Improved Oxidation Process Increases Sulfur Recovery with Claus Unit", 92.9 Hydrocarbon Processing (Oct. 15, 2013).

(Continued)

*Primary Examiner* — Timothy C Vanoy
(74) *Attorney, Agent, or Firm* — Bracewell LLP; Constance Gall Rhebergen (57) ABSTRACT

A method to recover sulfur from hydrogen sulfide in an acid gas stream comprising the steps of reacting the hydrogen sulfide and oxygen in the combustion furnace, transferring heat from the furnace effluent to produce a boiler effluent, reducing the temperature of the boiler effluent in the sulfur condenser, separating the water vapor from the non-condensed gases stream, reacting the sulfur dioxide and the hydrogen gas to produce hydrogen sulfide in the first hydrogenation reactor, reacting the hydrogen sulfide and oxygen in the reactor furnace to produce a reactor effluent, transferring heat from the reactor effluent to produce a cooled (Continued)

effluent, reducing the temperature of the cooled effluent in the sulfur cooler to produce a gases stream, separating the water vapor from the gases stream, reacting the sulfur dioxide and the hydrogen gas to produce hydrogen sulfide in the second hydrogenation reactor to produce a treated tail gas stream.

18 Claims, 5 Drawing Sheets

(51) Int. Cl.
| | |
|---|---|
| *B01D 53/04* | (2006.01) |
| *B01D 53/75* | (2006.01) |
| *B01D 53/34* | (2006.01) |
| *B01D 53/48* | (2006.01) |
| *B01D 5/00* | (2006.01) |
| *F23D 14/22* | (2006.01) |

(52) U.S. Cl.
CPC ............ *B01D 53/48* (2013.01); *B01D 53/75* (2013.01); *B01J 20/18* (2013.01); *C01B 17/0491* (2013.01); *F23D 14/22* (2013.01); *B01D 2253/108* (2013.01); *B01D 2257/80* (2013.01)

(58) Field of Classification Search
CPC .. B01D 53/75; B01D 53/76; B01D 2257/304; B01J 12/005; B01J 19/00; B01J 2219/00
See application file for complete search history.

(56) References Cited

U.S. PATENT DOCUMENTS

| | | | |
|---|---|---|---|
| 7,250,149 B1 | 7/2007 | Smith | |
| 7,311,891 B2 | 12/2007 | Dolan et al. | |
| 8,449,860 B2 | 5/2013 | Gupta | |
| 2002/0025284 A1* | 2/2002 | Watson | B01D 53/52 423/224 |
| 2002/0051743 A1* | 5/2002 | Watson | B01D 53/52 423/224 |
| 2007/0134147 A1 | 6/2007 | Graville | |
| 2010/0251613 A1* | 10/2010 | Thacker | B01D 53/1462 48/76 |

OTHER PUBLICATIONS

Zargaran, et al., "Simulation of Separation of Valuable Components from Tehran Refinery Flare Stack Gases", 53 Petroleum & Coal 78-83 (2011).

* cited by examiner

PROCESS FOR SULFUR RECOVERY FROM ACID GAS STREAM WITHOUT CATALYTIC CLAUS REACTORS

TECHNICAL FIELD

Disclosed are methods for sulfur recovery.

BACKGROUND

Sulfur recovery refers to the conversion of hydrogen sulfide ($H_2S$) to elemental sulfur. Hydrogen sulfide is a byproduct of processing natural gas and refining high-sulfur crude oils. The conventional method of sulfur recovery is the Claus process.

The conventional Claus process includes a thermal combustion stage and a catalytic reaction stage. In terms of equipment, the thermal combustion stage includes a thermal reactor and heat recovery units. The catalytic reaction stage includes two or three catalytic reactors along with associated re-heaters and condensers.

In the thermal combustion stage hydrogen sulfide, sulfur dioxide, and oxygen react to convert hydrogen sulfide to elemental sulfur in the thermal reactor. Approximately 60-70% of the hydrogen sulfide entering the thermal combustion stage can be converted to elemental sulfur. The elemental sulfur is separated through condensation and the remaining gases are introduced to the catalytic section. In the catalytic section, additional sulfur is produced by further reactions in the presence of a catalyst at lower temperatures than in the thermal reactor.

The conventional Claus process typically recovers 95 percent (%) to 98% of the hydrogen sulfide depending on the number of catalytic converters. Sulfur recovery efficiencies for Claus plants with two Claus converters are between 90% and 97%. Sulfur recovery efficiencies are between 95% and 98% for a Claus process with three catalytic converters.

But, there is increasing demand to achieve higher sulfur removal and recovery efficiency due to tight emissions regulations. Recent environmental regulations regarding sulfur oxides (SOx) emissions require a sulfur recovery efficiency in the range of 98.5% to 99.9% or higher. Conventional Claus processes fail to meet this requirement due to the equilibrium nature of the reactions in the Claus process. The equilibrium nature of the reactions impedes the conversion in the conventional Claus process. In order to achieve increased sulfur recovery in a conventional Claus process, addition of a tail-gas treatment units (TGTU) is required.

The addition of a tail-gas treatment unit (TGTU) can increase sulfur recovery to or greater than 99.9%, but requires complex and expensive equipment. The TGTU entails either an add-on unit at the end of the Claus unit or a modification to the Claus unit itself. The add-on TGTU at the end of the Claus unit is generally used when the Claus process includes two Claus converters. Although there are several varieties of tail gas treatment technologies, they can be grouped into the following four broad categories: sub-dew point Claus process, direct oxidation of $H_2S$ to sulfur, sulfur dioxide ($SO_2$) reduction and recovery of $H_2S$, and $H_2S$ combustion to $SO_2$ and recovery of $SO_2$.

Sub-dew point Claus processes are processes based on a Claus converter performing at temperatures below the sulfur dew point (lower temperature is desirable due to equilibrium nature of the Claus catalytic reaction). Sub-dew point processes provide high equilibrium conversions in one catalyst bed, but are complicated by the need for periodic catalyst regeneration by sulfur evaporation at elevated temperatures. To accommodate for regeneration, such processes are usually performed in two or three (or even more) parallel reactors, periodically undergoing reaction and regeneration. Cold-bed-adsorption (CBA) is the most efficient sub-dew point process and can achieve 99% sulfur recovery.

Processes involving direct oxidation of $H_2S$ to sulfur are based on selective oxidation of $H_2S$ by oxygen to elemental sulfur using selective catalysts. An example of a direct oxidation method includes the SuperClaus process.

TGTU technology based on $SO_2$ reduction and recovery of $H_2S$ involves the catalytic hydrogenation of leftover sulfur species to $H_2S$, absorption of the $H_2S$ with amine solution and then recycling the $H_2S$ back to the Claus furnace. An example of an $SO_2$ reduction and recovery of hydrogen sulfide process is the SCOT process.

TGTU technology based on $H_2S$ combustion to $SO_2$ and recovery of $SO_2$ involves the combustion of leftover $H_2S$ in the tail gas stream to $SO_2$, absorption of $SO_2$ with a solvent (wet scrubbing), and recycling the $SO_2$ back to the feed to the Claus plant. Although $SO_2$ scrubbing, also known as flue gas scrubbing, has not been commercially tested as a TGTU, the technology has been extensively used as flue gas scrubbing for coal based power stations.

Considering the complexity of a Claus process and the need for high cost TGTU to meet the environmental regulations, simpler and cheaper alternatives, which can be easily implemented and retrofitted to the existing units, is necessary and will be a significant contribution to the industry.

SUMMARY

Disclosed are methods for sulfur recovery.

In a first aspect, a method to recover sulfur from hydrogen sulfide in an acid gas feed is provided. The method includes the steps of introducing the acid gas feed to a combustion furnace, where the acid gas feed includes hydrogen sulfide, introducing an air feed to the combustion furnace, where the air feed includes oxygen, reacting the hydrogen sulfide and oxygen in the combustion furnace to produce a furnace effluent stream, where the furnace effluent stream includes hydrogen sulfide, elemental sulfur, sulfur dioxide, and water vapor, introducing the furnace effluent to a waste heat boiler, transferring heat from the furnace effluent to a water feed to produce a boiler effluent and a steam outlet, introducing the boiler effluent to a sulfur condenser, reducing the temperature of the boiler effluent in the sulfur condenser to produce a sulfur stream and a non-condensed gases, where the sulfur stream includes elemental sulfur, where the non-condensed gases includes hydrogen sulfide, sulfur dioxide, and water vapor, introducing the non-condensed gases to a first water adsorber, where the first water adsorber includes a first molecular sieve, separating the water vapor from the non-condensed gases stream to produce a first recovered water stream and a first dehydrated stream, where the first recovered water stream includes water, where the first dehydrated stream includes hydrogen sulfide, sulfur dioxide, and combinations of the same, introducing the first dehydrated stream into a first hydrogenation reactor, introducing a hydrogen feed to the first hydrogenation reactor, where the hydrogen feed includes hydrogen gas, reacting the sulfur dioxide and the hydrogen gas to produce hydrogen sulfide in the first hydrogenation reactor to produce a reduced stream, where the reduced stream includes hydrogen sulfide, introducing the reduced stream to a reactor furnace, introducing an air stream to the reactor furnace, where the air stream includes oxygen, introducing a fresh feed to the reactor furnace, where the fresh feed includes hydrogen sulfide, reacting the hydrogen sulfide and oxygen in the reactor furnace to produce a reactor effluent, where the reactor effluent includes hydrogen sulfide, elemental sulfur, sulfur dioxide, and water vapor, introducing the reactor effluent to a heat recovery boiler, transferring heat from the reactor effluent to a water stream to produce a cooled effluent and a steam stream, introducing the cooled effluent to a sulfur cooler, reducing the temperature of the cooled effluent in the sulfur cooler to produce a recovered sulfur stream and a gases stream, where the recovered sulfur stream includes elemental sulfur, where the gases stream includes hydrogen sulfide, sulfur dioxide, and water vapor, introducing the gases stream to a second water adsorber, where the second water adsorber includes a second molecular sieve, separating the water vapor from the gases stream to produce a second recovered water stream and a second dehydrated stream, where the second recovered water stream includes water, where the second dehydrated stream includes hydrogen sulfide and sulfur dioxide, introducing the second dehydrated stream into a second hydrogenation reactor, introducing a hydrogen stream to the second hydrogenation reactor, where the hydrogen stream includes hydrogen gas, reacting the sulfur dioxide and the hydrogen gas to produce hydrogen sulfide in the second hydrogenation reactor to produce a treated tail gas stream, where the treated tail gas stream includes hydrogen sulfide, and recycling the treated tail gas stream to the combustion furnace.

In certain aspects, a total conversion is determined. In certain aspects, the total conversion exceeds 99% by weight. In certain aspects, the first molecular sieve is zeolite-3A. In certain aspects, the second molecular sieve is zeolite-3A. In certain aspects, a temperature in the combustion furnace is between 1800 degrees Fahrenheit (deg F.) and 2500 deg F., and further where a temperature in the reaction furnace is between 1800 deg F. and 2500 deg F.

In certain aspects, a temperature in the sulfur condenser is between 100 deg F. and 200 deg F., and a temperature in the sulfur cooler is between 100 deg F. and 200 deg F. In certain aspects, a temperature in first water adsorber is between 75 deg C. and 170 deg C., and a temperature in the second water adsorber is between 75 deg C. and 170 deg C. In certain aspects, the first dehydrated stream comprises a concentration of water of less than 1 ppm, and the second dehydrated stream comprises a concentration of water less than 1 ppm. In certain aspects, a temperature in the first hydrogenation reactor is between 220 deg C. and 310 deg C., and where a temperature in the second hydrogenation reactor is between 220 deg C. and 310 deg C.

In a second aspect, a system to recover sulfur from hydrogen sulfide in an acid gas feed is provided. The system includes a combustion furnace configured to convert the hydrogen sulfide to elemental sulfur to produce a furnace effluent, where the furnace effluent includes elemental sulfur, hydrogen sulfide, sulfur dioxide, and water vapor, a waste heat boiler fluidly connected to the combustion furnace, the waste heat boiler configured to remove heat from the furnace effluent to produce a boiler effluent, a sulfur condenser fluidly connected to the waste heat boiler, the sulfur condenser configured to condense the elemental sulfur in boiler effluent to produce a sulfur stream and a non-condensed gases, where the non-condensed gases is in the absence of elemental sulfur, where the non-condensed gases includes water vapor, a first water adsorber fluidly connected to the sulfur condenser, the first water adsorber configured to remove water from the non-condensed gases to produce a first recovered water stream and a first dehydrated stream, where the first water adsorber includes a first molecular sieve, where the first dehydrated stream is in the absence of water vapor, where the first dehydrated stream includes sulfur dioxide, a first hydrogenation reactor fluidly connected to the first water adsorber, the first hydrogenation reactor configured to convert sulfur dioxide to hydrogen sulfide in the presence of hydrogen gas, a reactor furnace fluidly connected to the first hydrogenation reactor, the reactor furnace configured to convert hydrogen sulfide to elemental sulfur in the presence of oxygen and sulfur dioxide, a heat recovery boiler fluidly connected to the reactor furnace, the heat recovery boiler configured to remove heat from the reactor effluent to produce a boiler effluent, a sulfur cooler fluidly connected to the heat recovery boiler, the sulfur cooler configured to condense the elemental sulfur in reactor effluent to produce a recovered sulfur and a gases stream, where the gases stream is in the absence of elemental sulfur, where the gases stream includes water vapor, a second water adsorber fluidly connected to the sulfur condenser, the second water adsorber configured to remove water from the non-condensed gases to produce a second recovered water stream and a second dehydrated stream, where the second water adsorber includes a second molecular sieve, where the second dehydrated stream is in the absence of water vapor, where the second dehydrated stream includes sulfur dioxide, and a second hydrogenation reactor fluidly connected to the second water adsorber, the second hydrogenation reactor configured to convert sulfur dioxide to hydrogen sulfide in the presence of hydrogen gas to produce a treated tail gas stream, where the second hydrogenation reactor is fluidly connected to the combustion furnace, where the treated tail gas stream is recycled to the combustion furnace.

BRIEF DESCRIPTION OF THE DRAWINGS

These and other features, aspects, and advantages of the inventive scope will become better understood with regard to the following descriptions, claims, and accompanying drawings. It is to be noted, however, that the drawings illustrate only several embodiments and are therefore not to be considered limiting of the invention's scope.

DETAILED DESCRIPTION

While the scope will be described with several embodiments, it is understood that one of ordinary skill in the relevant art will appreciate that many examples, variations and alterations to the apparatus and methods described herein are within the scope and spirit. Accordingly, the embodiments described are set forth without any loss of generality, and without imposing limitations, on the claims. Those of skill in the art understand that the scope of the embodiments includes all possible combinations and uses of particular features described in the specification.

Systems and methods for recovering elemental sulfur from an acid gas stream containing hydrogen sulfide are described. The systems and methods are an improvement to the conventional Claus process because the systems and methods described here are in the absence of conventional Claus catalytic reactors. The systems and methods for recovering elemental sulfur advantageously increase the amount of elemental sulfur recovered and therefore reduce the amount of sulfur dioxide vented to atmosphere as compared to a conventional Claus process. Advantageously, the systems and methods for recovering elemental sulfur described here increase the ability for a process to meet environmental sulfur regulations.

The systems and methods for recovering elemental sulfur from an acid gas stream incorporates removal of water vapor ($H_2O$) and the absence of the Claus catalytic reaction to convert sulfur containing compounds to elemental sulfur.

As used herein, and unless otherwise specified the term "elemental sulfur" refers to sulfur vapor, which can be present as $S_2$, $S_3$, $S_4$, $S_5$, $S_6$, $S_7$, and $S_8$, due to simple polymerization. At temperatures greater than 1800 degrees Fahrenheit (deg F.), sulfur vapor is in the form of $S_2$. As the temperature is reduced the sulfur vapor shifts to other sulfur forms, including $S_6$ and $S_8$, according to the following reactions:

$$S_2 \leftrightharpoons \tfrac{1}{3}S_6 \tag{1}$$

$$S_2 \leftrightharpoons \tfrac{1}{4}S_8 \tag{2}$$

$$\tfrac{1}{3}S_6 \leftrightharpoons \tfrac{1}{4}S_8 \tag{3}$$

As used herein, "dew point" refers to the temperature of saturation of a vapor with a liquid. It is the temperature at which liquid evaporates at the same rate at which it condenses. Dew point for any compound is a function of the pressure and the composition of the vapor, including fraction of the compound in the vapor. Below the dew point of a component, the component will condense from the vapor phase.

As used herein, "wet gas stream" refers to a stream containing water vapor.

As used herein "in the absence of water vapor" or "in the absence of all water vapor" means that the dehydrated gas stream contains less than 0.1 parts-per-million (ppm).

As used herein, "air" refers to the gases that compose the atmosphere of the earth and include nitrogen, oxygen, argon, carbon dioxide, and combinations of the same.

Figure 1:
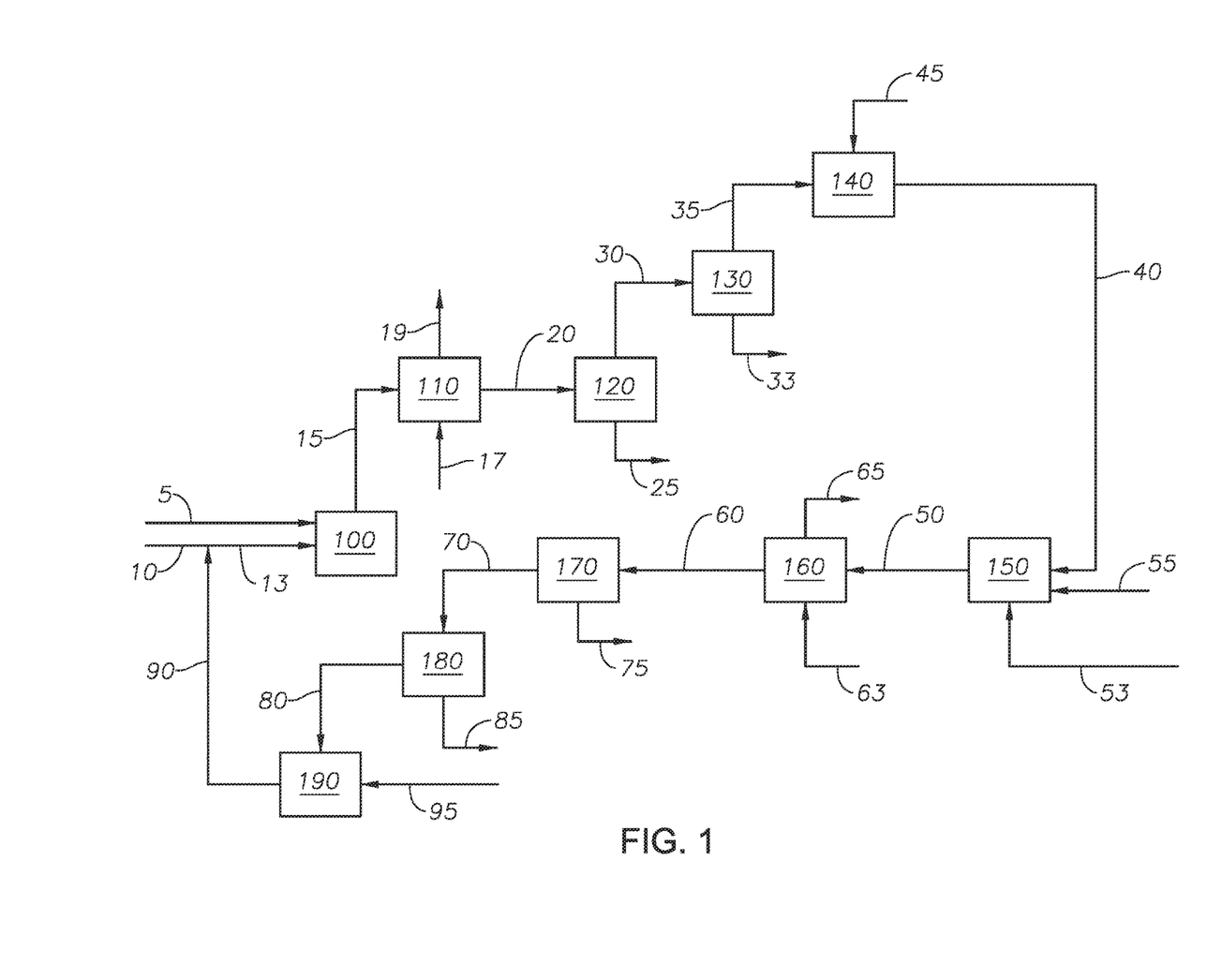
FIG. 1 is a process flow diagram of an embodiment of the sulfur recovery system.

Referring to FIG. 1, the system and methods of the sulfur recovery system are described. Acid gas feed 10 can be mixed with treated tail gas stream 90 to produce mixed acid gas feed 13. Acid gas feed 10 can be from any source that produces a gas stream containing hydrogen sulfide. Acid gas feed 10 can include hydrogen sulfide, carbon dioxide, other gases, and combinations of the same. Other gases can include carbon monoxide, water, nitrogen, hydrogen, impurities, and combinations of the same. Impurities can include hydrocarbons, ammonia, and combinations of the same. The nature and composition of the acid gas stream depends on the process that is the source for the acid gas stream and can be determined using any technology capable of analyzing the composition of an acid gas feed. Acid gas feed 10 can include a concentration of hydrogen sulfide between 80 mole % and 90 mole %, alternately between 70 mole % and 80 mole %, alternately between 60 mole % and 70 mole %, alternately less than 60 mole %, and alternately less than 40 mole %. In at least one embodiment, the concentration of hydrogen sulfide in acid gas feed 10 is between 65 mole % and 75 mole %. Mixed acid gas feed 13 can be introduced to combustion furnace 100.

Air feed 5 can be introduced to combustion furnace 100. Air feed 5 can be any gas stream containing oxygen suitable for use in the combustion furnace. Air feed 5 can be selected from an air stream, an oxygen-enriched air stream, a pure oxygen stream, or combinations of the same. Combustion furnace 100 can be any type of reaction unit capable of supporting the Claus thermal reactions at temperature greater than 1800 deg F. In combustion furnace 100 hydrogen sulfide, oxygen, and sulfur dioxide react to form elemental sulfur according to the following reactions:

$$H_2S + 3/2 O_2 \rightarrow H_2O + SO_2; \Delta H = -560 \text{ kJ/mol} \tag{4}$$

$$2H_2S + SO_2 \leftrightharpoons 3/2\, S_2 + 2H_2O; \Delta H = +47 \text{ kJ/mol} \tag{5}$$

where, $H_2S$ is hydrogen sulfide, $O_2$ is oxygen, $H_2O$ is water, $SO_2$ is sulfur dioxide, $S_2$ is elemental sulfur, $\Delta H$ is change in enthalpy, a negative value indicates a reaction is exothermic and a positive value indicates a reaction is endothermic.

The temperature of combustion furnace 100 can be between 1800 deg F. (982.2 degrees Celsius (deg C.)) and 2500 deg F. (1371.1 deg C.) and alternately between 1800 deg F. (982.2 deg C.) and 2200 deg F. (1371.1 deg C.). The pressure of combustion furnace 100 can be atmospheric pressure. At temperatures greater than 1800 deg F., endothermic formation of sulfur 2 ($S_2$) is favored. At lower reaction temperatures, the formation of sulfur 8 ($S_8$) is favored. Reaction (5) is equilibrium limited and slightly endothermic.

To maximize the conversion of hydrogen sulfide to sulfur, the ratio of hydrogen sulfide to sulfur dioxide in combustion furnace 100 can be maintained at 2 to 1. In at least one embodiment, the sulfur dioxide is produced in combustion furnace 100 such that combustion furnace 100 is in the absence of an externally supplied stream of sulfur dioxide. Controlling the flow rate of air feed 5 can control the amount of hydrogen sulfide burned in combustion furnace 100. In at least one embodiment, the flow rate of air feed 5 can be adjusted such that one-third of the hydrogen sulfide in combustion furnace 100 is oxidized to sulfur dioxide, see Reaction (4). In at least one embodiment, Reaction (5) results in between 60% and 70% of conversion of hydrogen sulfide to elemental sulfur.

Side reactions can occur in combustion furnace 100. Side reactions can include one or more of the following reactions, including all of the reactions.

$$CO_2 + H_2S \leftrightharpoons COS + H_2O \tag{6}$$

$$CO + \tfrac{1}{2}S_2 \leftrightharpoons COS \tag{7}$$

$$CH_4 + SO_2 \leftrightharpoons COS + H_2O + H_2 \tag{8}$$

$$CH_4 + 2S_2 \leftrightharpoons CS_2 + 2H_2S \tag{9}$$

$$2CO + S_2 \leftrightharpoons CS_2 + CO_2 \tag{10}$$

$$COS + H_2S \leftrightharpoons CS_2 + H_2O \tag{11}$$

$$CO_2 + 2H_2S \leftrightharpoons CS_2 + 2H_2O \tag{12}$$

$$C + S_2 \leftrightharpoons CS_2 \tag{13}$$

$$2COS + 3O_2 \leftrightharpoons 2SO_2 + 2CO_2 \tag{14}$$

$$2COS + O_2 \leftrightharpoons S_2 + CO_2 \tag{15}$$

$$2COS + SO_2 \leftrightarrows 3/2 S_2 + CO_2 \quad (16)$$

$$2CS_2 + 2SO_2 \leftrightarrows 3S_2 + 2CO_2 \quad (17)$$

$$H_2S \leftrightarrows 1/2 S_2 + H_2 \quad (18)$$

$$1/2 S_2 + O_2 \leftrightarrows SO_2 \quad (19)$$

$$SO_2 + 1/2 O_2 \leftrightarrows SO_3 \text{ (with excess air)} \quad (20)$$

$$1/2 S_2 + 3/2 O_2 \leftrightarrows SO_3 \text{ (with excess air)} \quad (21)$$

$$2NH_3 + 3/2 O_2 \leftrightarrows N_2 + 3H_2O \quad (22)$$

$$2NH_3 \leftrightarrows N_2 + 3H_2 \quad (23)$$

$$C_nH_{2n+1} + (6n+1)/2 O_2 \leftrightarrows nCO_2 + (2n+1)/2 H_2O \quad (24)$$

$$C_nH_{2n+2} + (2n+1)/2 O_2 \leftrightarrows nCO + (n+1)H_2O \quad (25)$$

The occurrence of an individual side reaction and the extent to which any one of the side reactions nears completion depends on the hydrogen sulfide concentration in acid gas feed 10. In at least one embodiment, furnace effluent 15 can include carbon disulfide ($CS_2$) and carbonyl sulfide (COS) which results in a reduction in overall sulfur recovery.

Furnace effluent 15 exits combustion furnace 100. Furnace effluent 15 can include hydrogen sulfide, sulfur dioxide, elemental sulfur, carbon dioxide, water, air, and other gases. The other gases can include contaminants. Contaminants can include carbon disulfide and carbonyl sulfide. The temperature of furnace effluent 15 can be between 1800 deg F. and 2200 deg F. Furnace effluent 15 can be introduced to waste heat boiler 110.

Waste heat boiler 110 can be any heat exchanger capable of removing heat from a stream and producing steam. Waste heat boiler 110 removes heat from furnace effluent 15 to produce boiler effluent 20. Waste heat boiler 110 can remove heat from furnace effluent 15 to heat water feed 17 to produce steam outlet 19. Steam outlet 19 can be high pressure steam (above 40 atm (4053 kPa)) or medium pressure stream (about 20 atm (2026.5 kPa). In at least one embodiment, steam outlet 19 is high pressure steam. Steam outlet 19 can be used to power a steam generator for the purpose of producing energy. The temperature of boiler effluent 20 can be between 550 deg F. (287.7 deg C.) and 600 deg F. (315.5 deg F.). Boiler effluent 20 is a gas stream. Boiler effluent 20 can include the same components present in furnace effluent 15. Boiler effluent 20 can be introduced to sulfur condenser 120.

Sulfur condenser 120 can be any heat exchanger capable of removing heat from a gas stream. Sulfur condenser 120 removes heat from boiler effluent 20 to condense the vapor phase elemental sulfur present in boiler effluent 20 to liquid sulfur in sulfur stream 25. The temperature in sulfur condenser 120 is between 100 deg C. and 200 deg C., alternately between 110 deg C. and 200 deg C., alternately between 120 deg C. and 200 deg C., alternately between 130 deg C. and 200 deg C., and alternately between 140 deg C. and 200 deg C. Sulfur stream 25 can contain between 60 weight % and 75 weight % of the sulfur in acid gas feed 10, and alternately between 65 weight % and 70 weight % of the sulfur in acid gas feed 10.

The temperatures of waste heat boiler 110 and sulfur condenser 120 can be designed in consideration of the exothermic nature of Reactions (1)-(3). As the temperature of the streams is reduced, the sulfur species shift from $S_2$ to $S_8$. At temperatures less than between 800 deg F., all of the $S_2$ is converted to other sulfur species. At temperatures less than 400 deg F., the $S_8$ sulfur species represents over 80% of the sulfur species present in the sulfur vapor.

The gases that do not condense exit sulfur condenser 120 as non-condensed gases 30. Non-condensed gases 30 can include hydrogen sulfide, sulfur dioxide, carbon dioxide, water, air, and other gases. Non-condensed gases 30 can be introduced to first water adsorber 130. First water adsorber 130 is a water adsorber. A water adsorber can remove water vapor from a gas stream to produce a dehydrated gas stream and a recovered water stream. The water adsorber can be any adsorption-dehydration column unit designed to remove water vapor from a wet gas stream. The water adsorber can be a two bed system, where at any time, one bed will be on an adsorption cycle and the second bed will be on a regeneration cycle. In at least one embodiment, first water adsorber 130 is a temperature swing adsorption (TSA) system. In a TSA system, the regeneration cycle is driven by an increase in the temperature of the regeneration bed compared to the temperature in the adsorption bed, causing components to desorb. In a pressure swing adsorption (PSA) system, the regeneration cycle is driven by a decrease in the pressure in the regeneration bed compared to the pressure in the adsorption bed, causing components to desorb. The sulfur recovery system does not operate at sufficient pressure to use a PSA system without expensive compression equipment. First water adsorber 130 is not a PSA system. The systems and methods for removing hydrogen sulfide in the absence of a PSA system. A TSA system can be used in the systems and methods for removing hydrogen sulfide. The TSA systems can be any commercially available TSA system.

The water adsorber can include any molecular sieve capable of selectively adsorbing water vapor from a wet gas stream while rejecting other components. Molecular sieves operate by selectively adsorbing certain components in a stream, while rejecting the remaining components in the gas phase due to their larger molecular diameter. Molecular sieves suitable for use in the water adsorbers of the sulfur recovery system have a pore size measured in Angstroms (Å). Molecular sieves have a crystal lattice that results in a well-ordered pore and cavity structure. The effective channel diameter of the cages of the molecular sieve determines whether or not a molecule with a certain kinetic diameter can diffuse into the cage and be adsorbed. Any molecular sieve that has an adsorption affinity towards water and a channel diameter small enough to exclude hydrogen sulfide, but large enough to allow water to pass through can be used in the water adsorber. Examples of molecular sieves that can be used in the present invention include zeolite-3A. Zeolite-3A includes a potassium zeolite, an effective channel diameter (pore diameter) of about 3 Å, and a bulk density of 44 pounds/cubic foot. The kinetic diameter of water is about 2.6 Å. Zeolite-3A adsorbs water vapor and ammonia. Hydrogen sulfide has a kinetic diameter of about 3.60 Å and is not adsorbed by zeolite-3A. The molecular sieve with zeolite-3A can include a binder. In certain embodiments, the molecular sieve is produced by binding micron sized zeolite crystals together to form pellets, as is known in the art. The binder can include silica or other inert materials. Without being bound by a particular theory, it is understood that because the binder is inert the performance of a molecular sieve is reduced proportionally to the amount of binder. It is understood that a pellet design can minimize the amount of binder without foregoing strength of the pellet. For example, the equilibrium adsorption capacity of a molecular sieve with zeolite-3A pellets with binder is about 20 percent by weight (wt %), in other words, 20% of the total weight is water at equilibrium. The binder in zeolite-3A can be about 9 weight %.

The amount of adsorbed water vapor molecules for a given adsorbent is a function of temperature and pressure. The amount of adsorbed water increases with increasing pressure and decreases with increasing temperature. The adsorption capacity of the molecular sieve with zeolite-3A for water vapor at 100 deg C. is greater than the adsorption capacity for water at 200 deg C. The temperature in first water adsorber 130 is between 75 deg C. and 170 deg C., alternately between 75 deg C. and 160 deg C., alternately between 75 deg C. and 150 deg C., and alternately between 75 deg C. and 140 deg C. In at least one embodiment, the temperature of first water adsorber is between 75 deg C. and 150 deg C. The concentration of water in first dehydrated stream 35 is less than 1 ppm, alternately less than 0.5 ppm, and alternately less than 0.1 ppm. In at least one embodiment, the concentration of water in first dehydrated stream 35 is less than 0.1 ppm.

First water adsorber 130 can remove water vapor from non-condensed gases stream 30 to produce first recovered water stream 33 and first dehydrated stream 35. First dehydrated stream 35 is in the absence of all or substantially all water vapor. First dehydrated stream 35 can contain hydrogen sulfide, sulfur dioxide, carbon dioxide, air, and other gases. First dehydrated stream 35 can be introduced to first hydrogenation reactor 140.

First hydrogenation reactor 140 can be any type of hydrogenation reactor capable of reducing a component in the presence of hydrogen. First hydrogenation reactor 140 can include a hydrogenation catalyst. The hydrogenation catalyst can include a cobalt and molybdenum catalyst on alumina. Hydrogen feed 45 is introduced to first hydrogenation reactor 140. Hydrogen feed 45 can include hydrogen gas. The temperature in first hydrogenation reactor 140 is between 220 deg C. and 310 deg C. and alternately between 280 deg C. and 300 deg C. In at least one embodiment, the temperature in first hydrogenation reactor 140 is 300 deg C. The pressure in first hydrogenation reactor 140 is between 0.5 atmosphere (atm) (50.6625 kilopascals (kPa)) and 1.5 atm (151.9875 kPa). In at least on embodiment, the pressure in first hydrogenation reactor 140 is 1 atm (101.325 kPa).

The operating conditions and catalyst in first hydrogenation reactor 140 can allow for the selective hydrogenation of sulfur dioxide to hydrogen sulfide in accordance with reaction 26:

$$SO_2 + 3H_2 \rightarrow H_2S + 2H_2O \quad (26)$$

Other reactions occur in first hydrogenation reactor 140 to convert sulfur containing compounds, including:

$$S + H_2 \rightarrow H_2S \quad (27)$$

$$COS + H_2O \rightarrow H_2S + CO_2 \quad (28)$$

$$CS_2 + 2H_2O \rightarrow 2H_2S + CO_2 \quad (29)$$

First hydrogenation reactor 140 can reduce the sulfur dioxide in first dehydrated stream 35 to hydrogen sulfide. First hydrogenation reactor 140 can produce reduced stream 40. Reduced stream 40 can include hydrogen sulfide, carbon dioxide, water, air, and other gases. Advantageously, removing water in first water adsorber 130 can reduce the amount of water in reduced stream 40 which minimizes the amount of water being introduced to reactor furnace 150, which increases the conversion to elemental sulfur according to Reaction (5), where Reaction (5) is thermodynamically equilibrium-controlled. Advantageously, removing water in first water adsorber 130 can reduce the volume of first hydrogenation reactor 140 and can reduce the volumetric flow rate of air stream 55 to reactor furnace 150, while maintaining a stable flame temperature.

Reduced stream 40 can be introduced to reactor furnace 150 along with air stream 55 and fresh feed 53. Air stream 55 can be any type of gas stream containing oxygen. Air stream 55 can be an air stream, can be an oxygen-enriched air stream, a pure oxygen stream, or combinations of the same. In at least one embodiment, air stream 55 is from the same source as air feed 5. Fresh feed 53 can be from any source that produces a gas stream containing hydrogen sulfide. Fresh feed 53 can include hydrogen sulfide, carbon dioxide, other gases, and combinations of the same. Other gases can include carbon monoxide, water, nitrogen, hydrogen, impurities, and combinations of the same. Impurities can include hydrocarbons, ammonia, and combinations of the same. Fresh feed 53 can provide additional hydrogen sulfide to maintain the flame temperature of reactor furnace 150. The flow rate of fresh feed 53 can be based on the concentration of hydrogen sulfide in reduced stream 40. The flow rate of fresh feed 53 can be increased when the concentration of hydrogen sulfide in reduced stream 40 is not sufficient to maintain the flame temperature in reactor furnace 150. Advantageously, the addition of fresh feed 53 can increase the processing capacity of the sulfur recovery system. In at least one embodiment, fresh feed 53 is from the same source as acid gas feed 10. Reactor furnace 150 can be a reaction unit as described with reference to combustion furnace 100. Reactions (4)-(22) can occur in reactor furnace 150. Reactor furnace 150 can produce reactor effluent 50. Reactor effluent 50 can include hydrogen sulfide, sulfur dioxide, elemental sulfur, carbon dioxide, water, air, and other gases. Reactor effluent 50 can be introduced to heat recovery boiler 160.

Heat recovery boiler 160 can be a heat exchanger as described with reference to waste heat boiler 110. Heat recovery boiler 160 can recover heat from reactor effluent 50 to heat water stream 63 and produce steam stream 65. Heat recovery boiler 160 can recover heat from reactor effluent 50 to produce cooled effluent 60. Cooled effluent 60 can be introduced to sulfur cooler 170.

Sulfur cooler 170 can be a heat exchanger as described with reference to sulfur condenser 120. Sulfur cooler 170 can condense vapor phase elemental sulfur in cooled effluent 60 to produce recovered sulfur stream 75. Recovered sulfur stream 75 can include liquid sulfur. The gases that do not condense exit sulfur cooler 170 as gases stream 70. Gases stream 70 can be introduced to second water adsorber 180.

Second water adsorber 180 can be a water adsorber as described with reference to first water adsorber 130. Second water adsorber 180 produces second recovered water stream 85 and second dehydrated stream 80. Second dehydrated stream 80 can be introduced to second hydrogenation reactor 190.

Second hydrogenation reactor 190 can be a hydrogenation reactor as described with reference to first hydrogenation reactor 140. Hydrogen stream 95 can be introduced to second hydrogenation reactor 190. Second hydrogenation reactor 190 can reduce the sulfur dioxide in second dehydrated stream 80 to hydrogen sulfide. The hydrogen sulfide exits second hydrogenation reactor 190 as treated tail gas stream 90. Treated tail gas stream 90 can be recycled to combustion furnace 100. Treated tail gas stream 90 can be mixed with acid gas feed 10 to produce mixed acid gas feed 13.

The operating conditions and stream components of reactor effluent 50 can be the same as furnace effluent 15. The operating conditions and stream components of cooled effluent 60 can be the same as boiler effluent 20. The operating conditions and stream components of gases stream 70 can be the same as non-condensed gases 30. The operating conditions and stream components of second dehydrated stream 80 can be the same as first dehydrated stream 35. The operating conditions and stream components of treated tail gas stream 90 can be the same as reduced stream 40.

A total conversion can be calculated based on the total elemental sulfur recovered and the amount of molecular sulfur in the acid gas feed and fresh feed. Total conversion in the sulfur recovery system can be between 99 wt % and 99.9 wt %. Advantageously, the recycle of treated tail gas stream 90 to combustion furnace 100 can increase the conversion of hydrogen sulfide to elemental sulfur.

Figure 4:
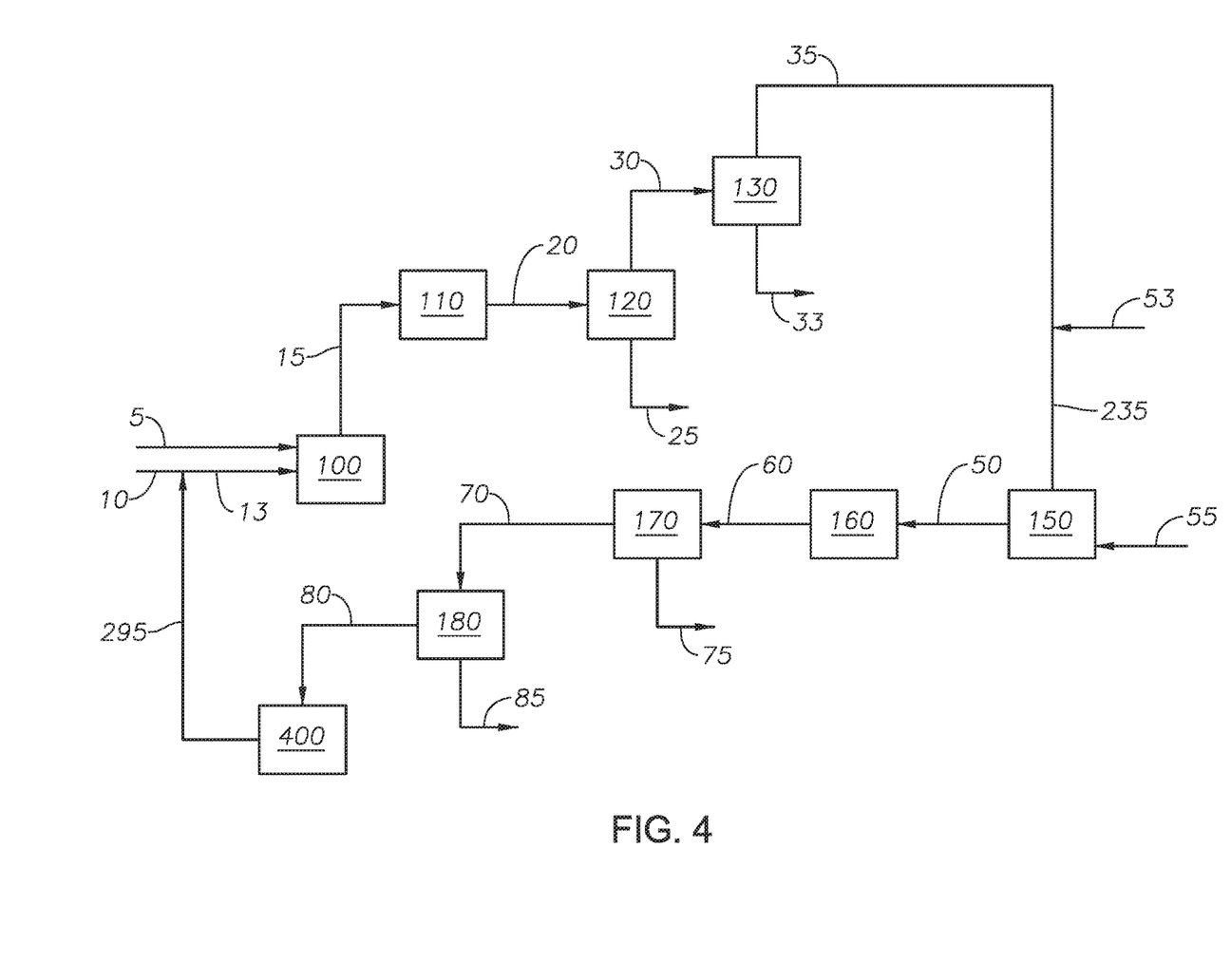
FIG. 4 is a process flow diagram of an embodiment of the sulfur recovery system.

In an alternate embodiment described with reference to FIG. 4, the sulfur recovery system does not include first hydrogenation reactor 140 and does not include second hydrogenation reactor 190. Second dehydrated stream 80 is introduced to TGTU 400. TGTU 400 can process the components in second dehydrated stream 80 to produce a stream comprising hydrogen sulfide. TGTU 400 can convert sulfur containing components to hydrogen sulfide and can replace a stand-alone hydrogenation reactor. In at least one embodiment, TGTU 400 is a commercially available process, such as a SCOT process. The hydrogen sulfide exits TGTU 400 in tail gas outlet 295. Tail gas outlet 295 is mixed with acid gas feed 10 to produced mixed acid gas feed 13.

The addition of the TGTU can prevent the buildup of carbon dioxide and nitrogen. In at least one embodiment, acid gas feed 10 can include hydrogen sulfide, carbon dioxide, and combinations of the same and TGTU 400 is included in the sulfur recovery system.

In at least one embodiment, acid gas feed 10 includes hydrogen sulfide and does not include carbon dioxide and the sulfur recovery system is in the absence of TGTU 400.

The systems and methods described here for removal of hydrogen sulfide are in the absence of a condenser designed to condense water vapor from a gas stream. Advantageously, the use of molecular sieves for adsorption can remove all or substantially all of the water vapor from a wet gas stream. The use of molecular sieves advantageously removes water to the ppm level as compared to a condenser, which is limited to removing water to the saturation point for the operating temperature and pressure. A condenser cannot be used to condense all or substantially all of the water vapor because the gas stream remains saturated with water vapor due to thermodynamic equilibrium. In a condenser, for any given temperature, the liquid water will be at equilibrium with the vapor (the gas phase will be saturated water vapor), because of this a condenser cannot remove enough water for the operation of the sulfur recovery system. In a molecular sieve, the adsorbent can continue to adsorb water vapor and thus remove water until the adsorbent is saturated.

The systems and methods described here for removal of hydrogen sulfide are in the absence of Claus catalytic converters. Advantageously, the absence of Claus catalytic converters eliminates the problems of catalyst deactivation due to catalyst fouling. The absence of Claus catalytic converters can eliminate the need for an adsorption bed for aromatics removal. Advantageously, the systems and methods described here for removal of hydrogen sulfide produce a greater amount of high pressure steam, which can be used to generate electricity. Advantageously, the systems and methods described here for removal of hydrogen sulfide can remove aromatics, such as benzene, toluene, and xylene, without the inclusion of an adsorption bed.

EXAMPLES

The process of the sulfur recovery system can be readily understood by Examples. The following examples were simulated using a HYSYS process simulator to simulate the method of the present embodiments.

Example 1

Figure 2:
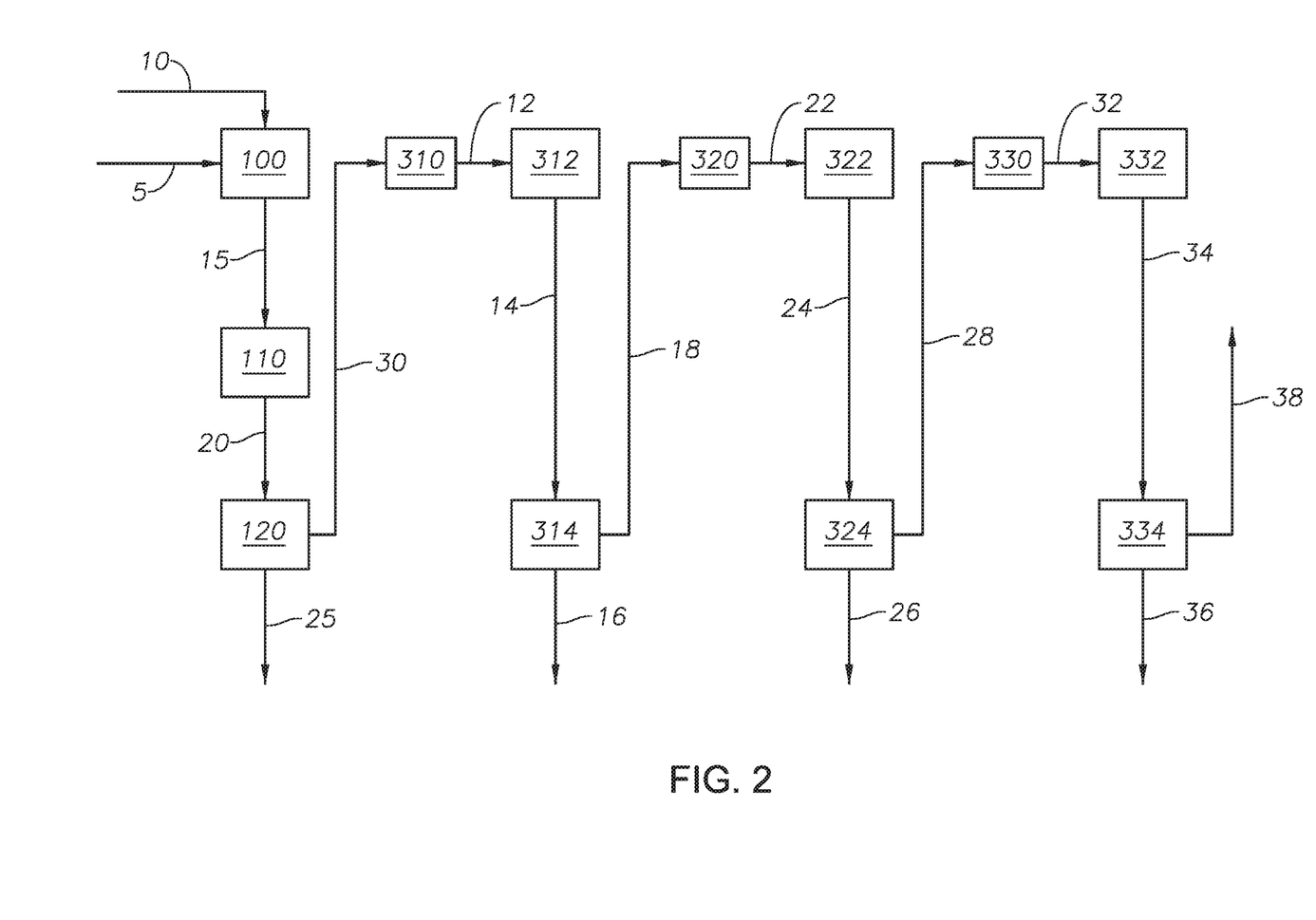
FIG. 2 is a process flow diagram of a conventional Claus process having three catalytic reactors.

Example 1, a comparative example, was simulated as a conventional Claus process, based on FIG. 2 with reference to FIG. 1. In the catalytic section, the simulation included three catalytic reactors 312, 322, and 332, along with three condensers 314, 324, and 334 and three reheaters 310, 320, and 330. Non-condensed gases 30 is introduced to first reheater 310 to increase the temperature to produce first heated gases 12. First heated gases 12 is introduced to first catalytic reactor 312. First catalytic effluent 14 is introduced to first condenser 314. First condenser 314 reduces the temperature of first catalytic effluent 14 to produce first liquid sulfur stream 16 and first condenser effluent 18. Second reheater 320 increases the temperature of first condenser effluent 18 to produce second heated gases 22. Second heated gases is introduced to second catalytic reactor 322 to produce second catalytic effluent 24. Second condenser 324 reduces the temperature of second catalytic effluent 24 to produce second liquid sulfur stream 26 and second condenser effluent 28. Second condenser effluent 28 is introduced to third reheater 330. Third reheater 330 increases the temperature of second condenser effluent 28 to produce third heated gases 32. Third heated gases 32 is introduced to third catalytic reactor 332. Third condenser 334 reduces the temperature of third catalytic effluent 34 to produce third liquid sulfur stream 36 and third condenser effluent 38. The stream compositions and properties are shown in Table 1.

TABLE 1

Stream properties and results for Example 1

| | Stream No. | | | | | | |
|---|---|---|---|---|---|---|---|
| | 10 | 15 | 20 | 14 | 24 | 34 | 38 |
| Temperature (C.) | 35 | 1136.9 | 300.0 | 332.85 | 233.95 | 203.9 | 135 |
| Pressure (psia) | 24.7 | 24.3 | 23.8 | 22.5 | 21.2 | 19.8 | 19.3 |
| Flow rate (lbmol/hr) | 213.56 | 594.41 | 553.60 | 532.42 | 525.03 | 522.96 | 522.7 |
| Flow rate (lb/hr) | 7771.8 | 18713.4 | 18713.4 | 15230.2 | 14146.7 | 13750.3 | 13689 |
| Composition (mole fraction) | | | | | | | |
| $H_2$ | 0 | 0.014 | 0.013 | 0.014 | 0.014 | 0.014 | 0.014 |
| $O_2$ | 0 | <0.001 | <0.001 | <0.001 | <0.001 | <0.001 | <0.001 |
| $N_2$ | 0 | 0.488 | 0.524 | 0.545 | 0.552 | 0.555 | 0.555 |
| CO | 0 | 0.009 | 0.007 | 0.008 | 0.008 | 0.008 | 0.008 |
| $CO_2$ | 0.242 | 0.078 | 0.083 | 0.093 | 0.095 | 0.095 | 0.096 |
| $H_2S$ | 0.750 | 0.047 | 0.053 | 0.022 | 0.007 | 0.004 | 0.004 |
| COS | 0 | 0.003 | 0.006 | <0.001 | <0.001 | <0.001 | <0.001 |
| $SO_2$ | 0 | 0.027 | 0.029 | 0.009 | 0.002 | <0.001 | <0.001 |
| $CS_2$ | 0 | 0.001 | <0.001 | <0.001 | <0.001 | <0.001 | <0.001 |
| $H_2O$ | 0 | 0.232 | <0.001 | 0.292 | 0.311 | 0.315 | 0.315 |
| $S_1$ vapor | 0 | <0.001 | <0.001 | <0.001 | <0.001 | <0.001 | <0.001 |
| $S_2$ vapor | 0 | 0.09 | <0.001 | <0.001 | <0.001 | <0.001 | <0.001 |
| $S_3$ vapor | 0 | 0.001 | <0.001 | <0.001 | <0.001 | <0.001 | <0.001 |
| $S_4$ vapor | 0 | <0.001 | <0.001 | <0.001 | <0.001 | <0.001 | <0.001 |
| $S_5$ vapor | 0 | <0.001 | <0.001 | <0.001 | <0.001 | <0.001 | <0.001 |
| $S_6$ vapor | 0 | <0.001 | 0.007 | 0.003 | <0.001 | <0.001 | <0.001 |
| $S_7$ vapor | 0 | <0.001 | 0.005 | 0.002 | <0.001 | <0.001 | <0.001 |
| $S_8$ vapor | 0 | <0.001 | 0.015 | 0.003 | 0.002 | <0.001 | <0.001 |
| Liquid sulfur | 0 | 0 | 0 | 0 | 0 | 0 | 0 |
| Argon | 0 | 0.006 | 0.006 | 0.006 | 0.006 | 0.007 | 0.007 |
| Light Hydrocarbons | 0.008 | <0.001 | <0.001 | <0.001 | <0.001 | <0.001 | <0.001 |
| Other Gases | 0 | <0.001 | <0.001 | <0.001 | <0.001 | <0.001 | <0.001 |

Example 2

Figure 3:
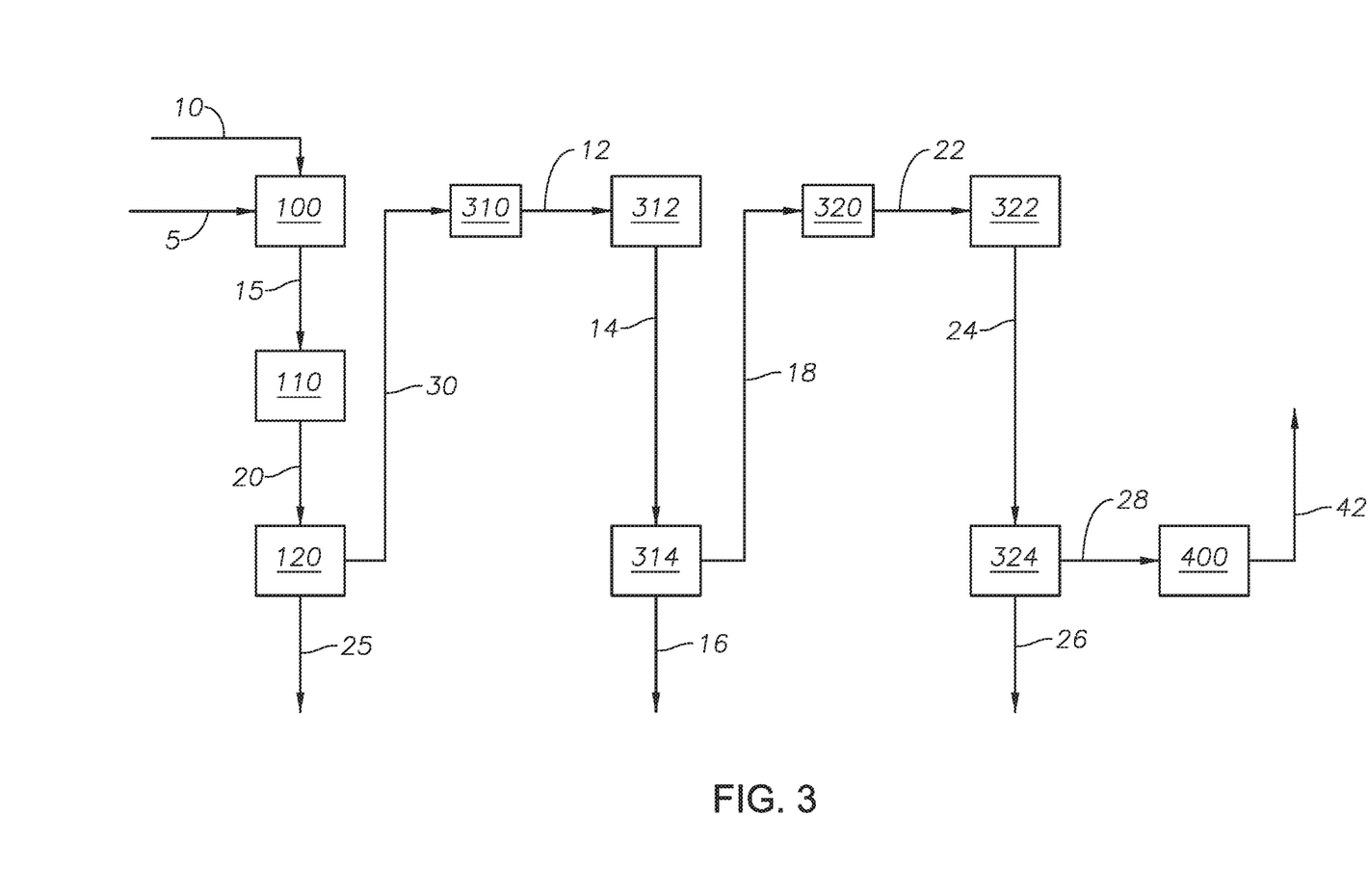
FIG. 3 is a process flow diagram of a conventional Claus process having two catalytic reactors and a TGTU.

Example 2, a comparative example, was simulated as a conventional Claus process with a TGTU, based on FIG. 3 with reference to FIGS. 1 and 2. In the catalytic section, the simulation included two catalytic reactors 312 and 322, along with two condensers 314 and 324 and two reheaters 310 and 320 and TGTU 400. Second condenser effluent 28 is introduced to TGTU 400. TGTU 400 was simulated as a commercial SCOT technology. TGTU 400 produces tail gas stream 42. The stream compositions and properties are shown in Table 2.

TABLE 2

Stream Properties and results for Example 2

| | Stream No. | | | | |
|---|---|---|---|---|---|
| | 10 | 15 | 14 | 24 | 42 |
| Temperature (C.) | 35 | 1111.8 | 336.9 | 234.7 | 35 |
| Pressure (psia) | 24.7 | 24.26 | 22.517 | 21.21 | 15.425 |
| Flow rate (kgmol/hr) | 96.87 | 282.8 | 253.9 | 250.3 | 194.2 |
| Flow rate (kg/hr) | 3525.3 | 8943.1 | 7317.1 | 6798.2 | 5638.8 |
| Composition (mole fraction) | | | | | |
| $H_2$ | 0 | 0.018 | 0.018 | 0.018 | 0.030 |
| $O_2$ | 0 | <0.001 | <0.001 | <0.001 | <0.001 |
| $N_2$ | 0 | 0.480 | 0.5344 | 0.542 | 0.770 |
| CO | 0 | 0.010 | 0.008 | 0.008 | <0.001 |
| $CO_2$ | 0.242 | 0.089 | 0.107 | 0.109 | 0.138 |
| $H_2S$ | 0.75 | 0.046 | 0.021 | 0.005 | <0.001 |
| COS | 0 | 0.002 | <0.001 | <0.001 | <0.001 |
| $SO_2$ | 0 | 0.029 | 0.011 | 0.003 | <0.001 |
| $CS_2$ | 0 | 0.226 | <0.001 | <0.001 | <0.001 |
| $H_2O$ | 0 | <0.001 | 0.284 | 0.304 | 0.053 |
| $S_1$ vapor | 0 | <0.001 | <0.001 | <0.001 | <0.001 |
| $S_2$ vapor | 0 | 0.091 | <0.001 | <0.001 | <0.001 |
| $S_3$ vapor | 0 | <0.001 | <0.001 | <0.001 | <0.001 |
| $S_4$ vapor | 0 | <0.001 | <0.001 | <0.001 | <0.001 |
| $S_5$ vapor | 0 | <0.001 | <0.001 | <0.001 | <0.001 |
| $S_6$ vapor | 0 | <0.001 | 0.003 | 0.001 | <0.001 |
| $S_7$ vapor | 0 | <0.001 | 0.002 | <0.001 | <0.001 |
| $S_8$ vapor | 0 | <0.001 | 0.003 | 0.002 | <0.001 |
| Liquid sulfur | 0 | 0 | 0 | 0 | 0 |
| Argon | 0 | 0.006 | 0.006 | 0.006 | 0.009 |
| Light Hydrocarbons | 0.008 | <0.001 | <0.001 | <0.001 | <0.001 |
| Other Gases | 0 | <0.001 | <0.001 | <0.001 | <0.001 |

Example 3

Example 3 is an example based on the systems and methods to recover sulfur in the sulfur recovery system. Example 3 was simulated based on the process flow diagram in FIG. 1. In Example 3, acid gas feed 10 is a stream of pure hydrogen sulfide. Air feed 5 and air stream 55 were simulated as pure oxygen. The stream compositions and properties are shown in Table 3.

TABLE 3

Stream Properties and results in Example 3

| | Stream No. | | | | | |
|---|---|---|---|---|---|---|
| | 10 | 90 | 15 | 53 | 40 | 50 |
| Temperature (C.) | 21.1 | 1148.9 | 1148.9 | 21.1 | 1148.9 | 1148.9 |
| Pressure (psia) | 40 | 40 | 40 | 40 | 40 | 40 |
| Flow rate (lbmol/hr) | 30 | 25 | 90 | 30 | 25 | 90 |
| Flow rate (lb/hr) | 1022.4 | 691.4 | 2433.8 | 1022.4 | 691.4 | 2433.8 |
| Composition (mole fraction) | | | | | | |
| $H_2$ | 0.000 | 0.000 | <0.001 | 0.000 | <0.001 | <0.001 |
| $O_2$ | 0.000 | 0.000 | <0.001 | 0.000 | 0.000 | <0.001 |
| $N_2$ | 0.000 | 0.000 | 0.000 | 0.000 | 0.000 | 0.000 |
| CO | 0.000 | 0.000 | 0.000 | 0.000 | 0.000 | 0.000 |
| $CO_2$ | 0.000 | 0.000 | 0.000 | 0.000 | 0.000 | 0.000 |
| $H_2S$ | 1 | 0.600 | 0.111 | 1 | 0.600 | 0.111 |
| COS | 0.000 | 0.000 | 0.000 | 0.000 | 0.000 | 0.000 |
| $SO_2$ | 0.000 | 0.000 | 0.056 | 0.000 | 0.000 | 0.056 |
| $CS_2$ | 0.000 | 0.000 | 0.000 | 0.000 | 0.000 | 0.000 |
| $H_2O$ | 0.000 | 0.400 | 0.500 | 0.000 | 0.400 | 0.500 |
| Sulfur Vapor | 0.000 | 0.000 | 0.333 | 0.000 | 0.000 | 0.333 |
| Liquid sulfur | 0.000 | 0.000 | 0.000 | 0.000 | 0.000 | 0.000 |
| Argon | 0.000 | 0.000 | 0.000 | 0.000 | 0.000 | 0.000 |
| Light Hydrocarbons | 0.000 | 0.000 | 0.000 | 0.000 | 0.000 | 0.000 |
| Other Gases | 0.000 | 0.000 | 0.000 | 0.000 | 0.000 | 0.000 |

Example 4

Example 4 is an example based on the systems and methods to recover sulfur in the sulfur recovery system. Example 4 was simulated based on the process flow diagram in FIG. 4. First dehydrated stream 35 is mixed with fresh feed 53 to produce mixed furnace feed 235. Mixed furnace feed 235 is introduced to reactor furnace 150. Second dehydrated stream 80 is introduced to TGTU 400. Tail gas outlet 295 is mixed with acid gas feed 10 to produced mixed acid gas feed 13. Air stream 55 is air with an oxygen concentration of 21%. The stream compositions and properties are shown in Table 4.

TABLE 4

Stream Properties and results in Example 4

| | Stream No. | | | | |
|---|---|---|---|---|---|
| | 10 | 15 | 235 | 250 | 295 |
| Vapor Fraction | 1 | 1 | 0.999 | 1 | 0.882 |
| Temperature (C.) | 35 | 1071.9 | 35 | 1014.4 | 35 |
| Pressure (psia) | 24.69 | 24.26 | 23.39 | 16.13 | 15.42 |
| Flow rate (kgmol/hr) | 260.5 | 649.9 | 1446.7 | 3128.1 | 2368.9 |
| Flow rate (kg/hr) | 9478.6 | 20748.7 | 50193.1 | 99088.4 | 70949 |
| Composition (mole fraction) | | | | | |
| $H_2$ | 0 | 0.017 | 0.007 | 0.015 | <0.001 |
| $O_2$ | 0 | <0.001 | <0.001 | <0.001 | <0.001 |
| $N_2$ | 0 | 0.465 | 0.209 | 0.516 | 0.734 |
| CO | 0 | 0.008 | 0.003 | 0.004 | <0.001 |
| $CO_2$ | 0.287 | 0.105 | 0.209 | 0.094 | 0.123 |
| H2S | 0.679 | 0.054 | 0.527 | 0.057 | <0.001 |
| COS | 0 | 0.002 | 0.002 | 0.001 | <0.001 |
| $SO_2$ | 0 | 0.028 | 0.012 | 0.028 | 0.002 |
| $CS_2$ | 0 | 0.001 | <0.001 | 0.003 | <0.001 |
| $H_2O$ | 0.031 | 0.221 | 0.022 | 0.196 | 0.053 |
| $S_1$ vapor | 0 | <0.001 | <0.001 | <0.001 | <0.001 |
| $S_2$ vapor | 0 | 0.001 | <0.001 | 0.078 | <0.001 |
| $S_3$ vapor | 0 | <0.001 | <0.001 | 0.001 | <0.001 |
| $S_4$ vapor | 0 | <0.001 | <0.001 | <0.001 | <0.001 |
| $S_5$ vapor | 0 | <0.001 | <0.001 | <0.001 | <0.001 |
| $S_6$ vapor | 0 | <0.001 | <0.001 | <0.001 | <0.001 |
| $S_7$ vapor | 0 | <0.001 | <0.001 | <0.001 | <0.001 |
| $S_8$ vapor | 0 | <0.001 | <0.001 | <0.001 | <0.001 |
| Liquid sulfur | 0 | 0 | 0 | 0 | 0.079 |
| Argon | 0 | 0.006 | 0.002 | 0.006 | 0.009 |
| Light Hydrocarbons | 0.003 | <0.001 | 0.005 | <0.001 | <0.001 |
| Other Gases | 0.000 | <0.001 | <0.001 | <0.001 | <0.001 |

Example 5

Example 5 is an example based on the systems and methods to recover sulfur in the sulfur recovery system. Example 5 was simulated based on the process flow diagram in FIG. 4. The difference between Example 4 and Example 5 is the composition of air stream 55. In this Example 5, air stream 55 was a dry air stream with 38% oxygen.

TABLE 5

Stream Properties and results in Example 5

| | Stream No. | | | | | |
|---|---|---|---|---|---|---|
| | 10 | 15 | 235 | 250 | 295 | 55 |
| Vapor Fraction | 1 | 1 | 0.999 | 1 | 0.882 | 1 |
| Temperature (C.) | 35 | 1086.3 | 35.1 | 1154.9 | 35 | 50 |
| Pressure (psia) | 24.69 | 24.26 | 23.39 | 16.13 | 15.42 | 24.70 |
| Flow rate, kgmol/hr | 276.7 | 703.8 | 1479.8 | 2380.7 | 1428.2 | 873.9 |
| Flow rate, kg/hr | 10008.6 | 22362.3 | 51137.7 | 77185.7 | 44479.8 | 25911.5 |
| Composition (mole fraction) | | | | | | |
| $H_2$ | 0 | 0.017 | 0.008 | 0.024 | <0.001 | 0 |
| $O_2$ | 0 | <0.001 | <0.001 | <0.001 | <0.001 | 0.387 |
| $N_2$ | 0 | 0.471 | 0.224 | 0.361 | 0.660 | 0.605 |
| CO | 0 | 0.008 | 0.003 | 0.019 | <0.001 | 0 |
| $CO_2$ | 0.265 | 0.094 | 0.203 | 0.110 | 0.198 | <0.001 |
| $H_2S$ | 0.701 | 0.054 | 0.517 | 0.053 | <0.001 | 0 |
| COS | 0 | 0.002 | 0.002 | 0.004 | 0.001 | 0 |
| $SO_2$ | 0 | 0.027 | 0.013 | 0.029 | 0.001 | 0 |
| $CS_2$ | 0 | 0.001 | <0.001 | 0.002 | <0.001 | 0 |
| $H_2O$ | 0.031 | 0.224 | 0.021 | 0.273 | 0.053 | 0 |

TABLE 5-continued

Stream Properties and results in Example 5

| | Stream No. | | | | | |
|---|---|---|---|---|---|---|
| | 10 | 15 | 235 | 250 | 295 | 55 |
| $S_1$ vapor | 0 | <0.001 | <0.001 | <0.001 | <0.001 | 0 |
| $S_2$ vapor | 0 | 0.093 | <0.001 | 0.119 | <0.001 | 0 |
| $S_3$ vapor | 0 | <0.001 | <0.001 | <0.001 | <0.001 | 0 |
| $S_4$ vapor | 0 | <0.001 | <0.001 | <0.001 | <0.001 | 0 |
| $S_5$ vapor | 0 | <0.001 | <0.001 | <0.001 | <0.001 | 0 |
| $S_6$ vapor | 0 | <0.001 | <0.001 | <0.001 | <0.001 | 0 |
| $S_7$ vapor | 0 | <0.001 | <0.001 | <0.001 | <0.001 | 0 |
| $S_8$ vapor | 0 | <0.001 | <0.001 | <0.001 | <0.001 | 0 |
| Liquid sulfur | 0 | 0 | 0 | <0.001 | 0.079 | 0 |
| Argon | 0 | 0.005 | 0.003 | 0.004 | 0.008 | 0.007 |
| Light Hydrocarbons | 0.003 | <0.001 | 0.005 | <0.001 | <0.001 | 0 |
| Other Gases | 0.000 | <0.001 | <0.001 | <0.001 | <0.001 | 0 |

Table 6 shows the results across Examples 1-5.

TABLE 6

Sulfur Conversion in the Units

| Example | Combustion Furnace 100 | Reactor Furnace 150 | First Catalytic Reactor 312 | Second Catalytic Reactor 322 | Third Catalytic Reactor 332 | TGTU 400 | Overall |
|---|---|---|---|---|---|---|---|
| 1 | 70.2149% | N/A | 89.0940% | 96.8228% | 98.0296% | N/A | 98.0296% |
| 2 | 68.1333% | N/A | 88.6805% | 97.1516% | N/A | 99.9578% | 99.9578% |
| 3 | 67.7% | 67.7% | N/A | N/A | N/A | N/A | 100% |
| 4 | 68.78% | 64.46% | N/A | N/A | N/A | 99.48% | 99.48% |
| 5 | 68.83% | 72.76% | N/A | N/A | N/A | 99.62% | 99.62% |

The results in Table 6 show that total conversion in the sulfur recovery system can reach 99.5%.

Example 6

Example 6 is an example based on the systems and methods to recover sulfur in the sulfur recovery system. Example 6 was simulated based on the process flow diagram in FIG. 4 and Example 5. Example 6 tested the sulfur recovery efficiency due to varying the amount of oxygen in air stream 55. All other inputs from Example 5 were maintained. Table 7 provides the data from Example 6. As shown in Table 7, the simulation of Example 5 had a 99.62 percent sulfur recovery.

TABLE 7

Sulfur Recovery Efficiency

| Amount of oxygen in Air Stream 55 (mole fraction) | Sulfur Recovery Efficiency (%) |
|---|---|
| 0.21 | 99.43 |
| 0.38 | 99.62 |
| 0.49 | 99.60 |
| 0.58 | 99.57 |
| 0.66 | 99.66 |

Figure 5:
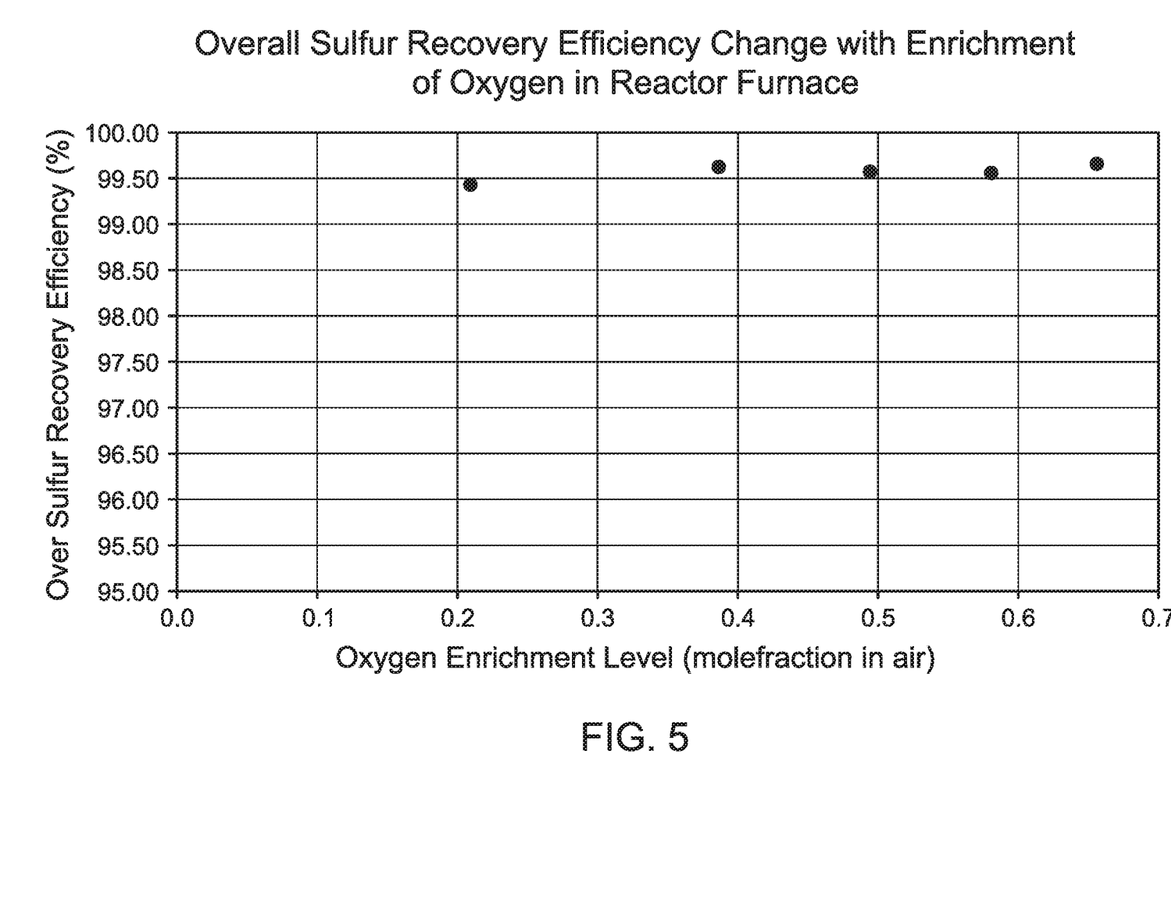
FIG. 5 is a chart showing the sulfur recovery efficiency change with oxygen content in the air stream to the second furnace in Example 6.

FIG. 5 provides a graph of the results of Table 7.

Although embodiments have been described in detail, it should be understood that various changes, substitutions, and alterations can be made without departing from the principle and scope of the invention. Accordingly, the scope should be determined by the following claims and their appropriate legal equivalents.

The singular forms "a," "an," and "the" include plural referents, unless the context clearly dictates otherwise.

"Optional" or "optionally" means that the subsequently described event or circumstances can or may not occur. The description includes instances where the event or circumstance occurs and instances where it does not occur.

Ranges may be expressed throughout as from about one particular value to about another particular value. When such a range is expressed, it is to be understood that another embodiment is from the one particular value to the other particular value, along with all combinations within said range.

As used throughout and in the appended claims, the words "comprise," "has," and "include" and all grammatical variations thereof are each intended to have an open, non-limiting meaning that does not exclude additional elements or steps.

As used throughout, terms such as "first" and "second" are assigned based on the position of the unit in the flow path and are merely intended to differentiate between two or more of the same units in the system. It is to be understood that the words "first" and "second" serve no other purpose and are not part of the name or description of the component. Furthermore, it is to be understood that that the mere use of the term "first" and "second" does not require that there be any "third" component, although that possibility is contemplated under the scope.

What is claimed is:

1. A method to recover sulfur from hydrogen sulfide in an acid gas feed, the method comprising the steps of:
   introducing the acid gas feed to a combustion furnace, where the acid gas feed comprises hydrogen sulfide;
   introducing an air feed to the combustion furnace, where the air feed comprises oxygen;

reacting the hydrogen sulfide and oxygen in the combustion furnace to produce a furnace effluent stream, where the furnace effluent stream comprises hydrogen sulfide, elemental sulfur, sulfur dioxide, and water vapor;

introducing the furnace effluent to a waste heat boiler;

transferring heat from the furnace effluent to a water feed to produce a boiler effluent and a steam outlet;

introducing the boiler effluent to a sulfur condenser;

reducing the temperature of the boiler effluent in the sulfur condenser to produce a sulfur stream and a non-condensed gases, where the sulfur stream comprises elemental sulfur, where the non-condensed gases comprises hydrogen sulfide, sulfur dioxide, and water vapor;

introducing the non-condensed gases to a first water adsorber, where the first water adsorber comprises a first molecular sieve;

separating the water vapor from the non-condensed gases stream in the first water adsorber to produce a first recovered water stream and a first dehydrated stream, where the first recovered water stream comprises water, where the first dehydrated stream comprises hydrogen sulfide, sulfur dioxide, and combinations of the same;

introducing the first dehydrated stream into a first hydrogenation reactor;

introducing a hydrogen feed to the first hydrogenation reactor, where the hydrogen feed comprises hydrogen gas;

reacting the sulfur dioxide and the hydrogen gas to produce hydrogen sulfide in the first hydrogenation reactor to produce a reduced stream, where the reduced stream comprises hydrogen sulfide;

introducing the reduced stream to a reactor furnace;

introducing an air stream to the reactor furnace, where the air stream comprises oxygen;

introducing a fresh feed to the reactor furnace, where the fresh feed comprises hydrogen sulfide;

reacting the hydrogen sulfide and oxygen in the reactor furnace to produce a reactor effluent, where the reactor effluent comprises hydrogen sulfide, elemental sulfur, sulfur dioxide, and water vapor;

introducing the reactor effluent to a heat recovery boiler;

transferring heat from the reactor effluent to a water stream to produce a cooled effluent and a steam stream;

introducing the cooled effluent to a sulfur cooler;

reducing the temperature of the cooled effluent in the sulfur cooler to produce a recovered sulfur stream and a gases stream, where the recovered sulfur stream comprises elemental sulfur, where the gases stream comprises hydrogen sulfide, sulfur dioxide, and water vapor;

introducing the gases stream to a second water adsorber, where the second water adsorber comprises a second molecular sieve;

separating the water vapor from the gases stream in the second water adsorber to produce a second recovered water stream and a second dehydrated stream, where the second recovered water stream comprises water, where the second dehydrated stream comprises hydrogen sulfide and sulfur dioxide;

introducing the second dehydrated stream into a second hydrogenation reactor;

introducing a hydrogen stream to the second hydrogenation reactor, where the hydrogen stream comprises hydrogen gas;

reacting the sulfur dioxide and the hydrogen gas to produce hydrogen sulfide in the second hydrogenation reactor to produce a treated tail gas stream, where the treated tail gas stream comprises hydrogen sulfide; and recycling the treated tail gas stream to the combustion furnace.

2. The method of claim 1, where a total conversion is determined.

3. The method of claim 2, where the total conversion exceeds 99% by weight.

4. The method of claim 1, where the first molecular sieve comprises zeolite-3A, and further where the second molecular sieve comprises zeolite-3A.

5. The method of claim 1, where a temperature in the combustion furnace is between 1800 deg and 2500 deg F., and further where a temperature in the reaction furnace is between 1800 deg F. and 2500 deg F.

6. The method of claim 1, where a temperature in the sulfur condenser is between 100 deg F. and 200 deg F., and further where a temperature in the sulfur cooler is between 100 deg F. and 200 deg F.

7. The method of claim 1, where a temperature in first water adsorber is between 75 deg C. and 170 deg C., and further where a temperature in the second water adsorber is between 75 deg C. and 170 deg C.

8. The method of claim 1, where the first dehydrated stream comprises a concentration of water of less than 1 ppm, and further where the second dehydrated stream comprises a concentration of water less than 1 ppm.

9. The method of claim 1, where a temperature in the first hydrogenation reactor is between 220 deg C. and 310 deg C., and where a temperature in the second hydrogenation reactor is between 220 deg C. and 310 deg C.

10. A system to recover sulfur from hydrogen sulfide in an acid gas stream, the system comprising:

a combustion furnace, the combustion furnace configured to convert the hydrogen sulfide to elemental sulfur to produce a furnace effluent, wherein the furnace effluent comprises elemental sulfur, hydrogen sulfide, sulfur dioxide, and water vapor;

a waste heat boiler fluidly connected to the combustion furnace, the waste heat boiler configured to remove heat from the furnace effluent to produce a boiler effluent;

a sulfur condenser fluidly connected to the waste heat boiler, the sulfur condenser configured to condense the elemental sulfur in boiler effluent to produce a sulfur stream and a non-condensed gases, where the non-condensed gases is in the absence of elemental sulfur, where the non-condensed gases comprises water vapor;

a first water adsorber fluidly connected to the sulfur condenser, the first water adsorber configured to remove water from the non-condensed gases to produce a first recovered water stream and a first dehydrated stream, where the first water adsorber comprises a first molecular sieve, where the first dehydrated stream is in the absence of water vapor, where the first dehydrated stream comprises sulfur dioxide;

a first hydrogenation reactor fluidly connected to the first water adsorber, the first hydrogenation reactor configured to convert sulfur dioxide to hydrogen sulfide in the presence of hydrogen gas;

a reactor furnace fluidly connected to the first hydrogenation reactor, the reactor furnace configured to convert hydrogen sulfide to elemental sulfur in the presence of oxygen and sulfur dioxide;

a heat recovery boiler fluidly connected to the reactor furnace, the heat recovery boiler configured to remove heat from the reactor effluent to produce a boiler effluent;

a sulfur cooler fluidly connected to the heat recovery boiler, the sulfur cooler configured to condense the elemental sulfur in reactor effluent to produce a recovered sulfur stream and a gases stream, where the gases stream is in the absence of elemental sulfur, where the gases stream comprises water vapor;

a second water adsorber fluidly connected to the sulfur condenser, the second water adsorber configured to remove water from the non-condensed gases to produce a second recovered water stream and a second dehydrated stream, where the second water adsorber comprises a second molecular sieve, where the second dehydrated stream is in the absence of water vapor, where the second dehydrated stream comprises sulfur dioxide; and a second hydrogenation reactor fluidly connected to the second water adsorber, the second hydrogenation reactor configured to convert sulfur dioxide to hydrogen sulfide in the presence of hydrogen gas to produce a treated tail gas stream, where the second hydrogenation reactor is fluidly connected to the combustion furnace, where the treated tail gas stream is recycled to the combustion furnace.

11. The system of claim 10, where a total conversion is determined.

12. The system of claim 11, where the total conversion exceeds 99% by weight.

13. The system of claim 10, where the first molecular sieve comprises zeolite-3A, and further where the second molecular sieve is zeolite-3A.

14. The system of claim 10, where a temperature in the combustion furnace is between 1800 deg and 2500 deg F., and further where a temperature in the reaction furnace is between 1800 deg F. and 2500 deg F.

15. The system of claim 10, where a temperature in the sulfur condenser is between 100 deg F. and 200 deg F., and further where a temperature in the sulfur cooler is between 100 deg F. and 200 deg F.

16. The system of claim 10, where a temperature in first water adsorber is between 75 deg C. and 170 deg C., and further where a temperature in the second water adsorber is between 75 deg C. and 170 deg C.

17. The method of claim 10, where the first dehydrated stream comprises a concentration of water of less than 1 ppm, and further where the second dehydrated stream comprises a concentration of water less than 1 ppm.

18. The method of claim 10, where a temperature in the first hydrogenation reactor is between 220 deg C. and 310 deg C., and where a temperature in the second hydrogenation reactor is between 220 deg C. and 310 deg C.

* * * * *